(12) United States Patent
Schmeltz

(10) Patent No.: US 8,387,386 B2
(45) Date of Patent: Mar. 5, 2013

(54) COMBINATION RANKINE CYCLE SYSTEM AND HYDRAULIC ACCUMULATOR SYSTEM

(75) Inventor: Sterling Schmeltz, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1329 days.

(21) Appl. No.: 11/559,828

(22) Filed: Nov. 14, 2006

(65) Prior Publication Data

US 2008/0110171 A1 May 15, 2008

(51) Int. Cl.
*F02G 3/00* (2006.01)
*F01K 23/10* (2006.01)
*F01K 13/02* (2006.01)
*F01K 15/00* (2006.01)

(52) U.S. Cl. .............. 60/614; 60/618; 60/660; 60/668

(58) Field of Classification Search .............. 60/614, 60/616, 618, 660, 668
See application file for complete search history.

(56) References Cited

U.S. PATENT DOCUMENTS

| | | | | |
|---|---|---|---|---|
| 1,808,165 A * | 6/1931 | Harris | .................. | 123/41.31 |
| 3,357,413 A * | 12/1967 | Quinton | .................. | 123/41.05 |
| 4,031,705 A * | 6/1977 | Berg | .................. | 60/618 |
| 4,083,188 A * | 4/1978 | Kumm | .................. | 60/605.1 |
| 4,112,687 A * | 9/1978 | Dixon | .................. | 60/641.6 |
| 4,179,884 A * | 12/1979 | Koeslin | .................. | 60/321 |
| 4,235,077 A * | 11/1980 | Bryant | .................. | 60/618 |
| 4,637,211 A * | 1/1987 | White et al. | .................. | 60/650 |
| 5,117,635 A | 6/1992 | Blau | | |
| 5,363,642 A * | 11/1994 | Frutschi et al. | .................. | 60/774 |
| 5,549,174 A * | 8/1996 | Reis | .................. | 60/618 |
| 6,041,602 A * | 3/2000 | Dickey | .................. | 60/605.2 |
| 6,250,258 B1 * | 6/2001 | Liebig | .................. | 122/406.5 |
| 6,539,711 B1 * | 4/2003 | Raychinov | .................. | 60/413 |
| 6,725,662 B2 | 4/2004 | Baba et al. | | |
| 6,837,049 B2 * | 1/2005 | Ogawa et al. | .................. | 60/614 |
| 6,910,333 B2 * | 6/2005 | Minemi et al. | .................. | 60/618 |
| 6,913,068 B2 * | 7/2005 | Togawa et al. | .................. | 60/614 |
| 6,952,924 B2 | 10/2005 | Tsutsui et al. | | |
| 6,966,394 B2 * | 11/2005 | Fleming | .................. | 180/165 |
| 2002/0007636 A1 * | 1/2002 | Hay | .................. | 60/618 |
| 2003/0005696 A1 * | 1/2003 | Wilson | .................. | 60/618 |
| 2004/0184923 A1 | 9/2004 | Iwanami et al. | | |
| 2004/0211180 A1 | 10/2004 | Hisanaga et al. | | |
| 2005/0262842 A1 * | 12/2005 | Claassen et al. | .................. | 60/618 |

* cited by examiner

*Primary Examiner* — Mary A Davis
(74) *Attorney, Agent, or Firm* — Julia Voutyras; Alleman Hall McCoy Russell & Tuttle LLP

(57) ABSTRACT

A method for using a combination Rankine cycle system and hydraulic accumulator system is provided for driving at least one vehicle component. The method includes generating fluid power from a Rankine cycle system to drive the at least one vehicle component during a first engine state and generating fluid power from a hydraulic accumulator system to drive the at least one vehicle component during a second engine state.

12 Claims, 5 Drawing Sheets ically, U.S. Pat. No. 6,952,924 describes a
COMBINATION RANKINE CYCLE SYSTEM AND HYDRAULIC ACCUMULATOR SYSTEM

FIELD

The present application relates to systems, apparatus and methods for using a Rankine cycle system in combination with a hydraulic accumulator system to drive a vehicle component.

BACKGROUND AND SUMMARY

As fuel costs rise, efforts have been made to improve fuel economy in vehicles. By improving engine efficiency, it may be possible to improve fuel economy. Various systems and methods to improve engine efficiency have been explored.

One such system which may be used to improve energy efficiency is a Rankine cycle system. Rankine cycle systems utilize the Rankine thermodynamic cycle converting heat energy into mechanical work. A Rankine cycle system generally includes the following components: a boiler, a turbine, a condenser and a pump. As an example of a Rankine cycle system, working medium, such as water, may be circulated through a piping system to the various components such that the working medium is expanded to drive a linked mechanical device. For example, water may be supplied by the pump to an evaporator or boiler to generate water vapor. The vapor may be expanded through a turbine generating power output. The vapor may cycle back to a condenser where the vapor may be converted back to the liquid phase.

In the past, attempts have been made to incorporate Rankine cycle systems in vehicles and to improve the efficiency of such systems. For example, U.S. Pat. No. 6,725,662 discloses one approach of using the Rankine cycle for use in a vehicle drive system. Similarly, U.S. Pat. No. 6,952,924 describes a Rankine cycle apparatus for use in vehicle including a system to address leakage of the working medium from the system.

As another example of use of the Rankine cycle in a vehicle, United States Patent Publication Number 2004/0211180 discloses an approach for collecting waste heat from an engine through a Rankine cycle system to generate a rotational driving force.

Further, United States Patent Publication Number 2004/0184923 discloses a fluid machine operable in both a pump mode for pressurizing fluid and a motor mode for converting fluid pressure and outputting mechanical energy. A specific valve mechanism is described which enables operation of both the pump mode and the motor mode.

The inventor herein has recognized that application of a Rankine cycle system in vehicles may be limited in some applications where the working medium is not maintained at an operating temperature. Thus, the Rankine cycle system may not be fully operational during all conditions. For example, a Rankine cycle system may not produce the desired energy output during initial cold start-up of a vehicle. Time may be required for the working medium to reach a sufficient operating temperature.

Some of the issues associated with such application of a Rankine cycle system may be addressed by incorporation of a combination Rankine cycle system (or other exhaust gas heat recovery system) with a hydraulic accumulator system. In the combined system, the hydraulic accumulator system may discharge fluid power from a hydraulic accumulator when the Rankine cycle system is offline, such as the period of time when the working fluid is warming to an operational temperature.

As an example, a combination system may be used to run one or more vehicle components, such as the front end accessory drive (FEAD), including the alternator, the AC compressor, water pump, power steering pump, etc. When the engine is first started, a hydraulic accumulator system may be used to discharge fluid power to a hydraulic motor operatively coupled to a vehicle accessory. The hydraulic accumulator may provide the power to the hydraulic motor while the working medium in the Rankine cycle system is heating up. Once the working medium is at an operational temperature, the Rankine cycle system may take over driving the hydraulic pump and hydraulic motor to provide hydraulic power to run the FEAD. Upon engine shut off, the Rankine cycle system may be used to create fluid power for storage in the accumulator for use when the vehicle is restarted. By using the combination system to create FEAD drive, engine efficiency may be improved.

DETAILED DESCRIPTION

Figure 1:
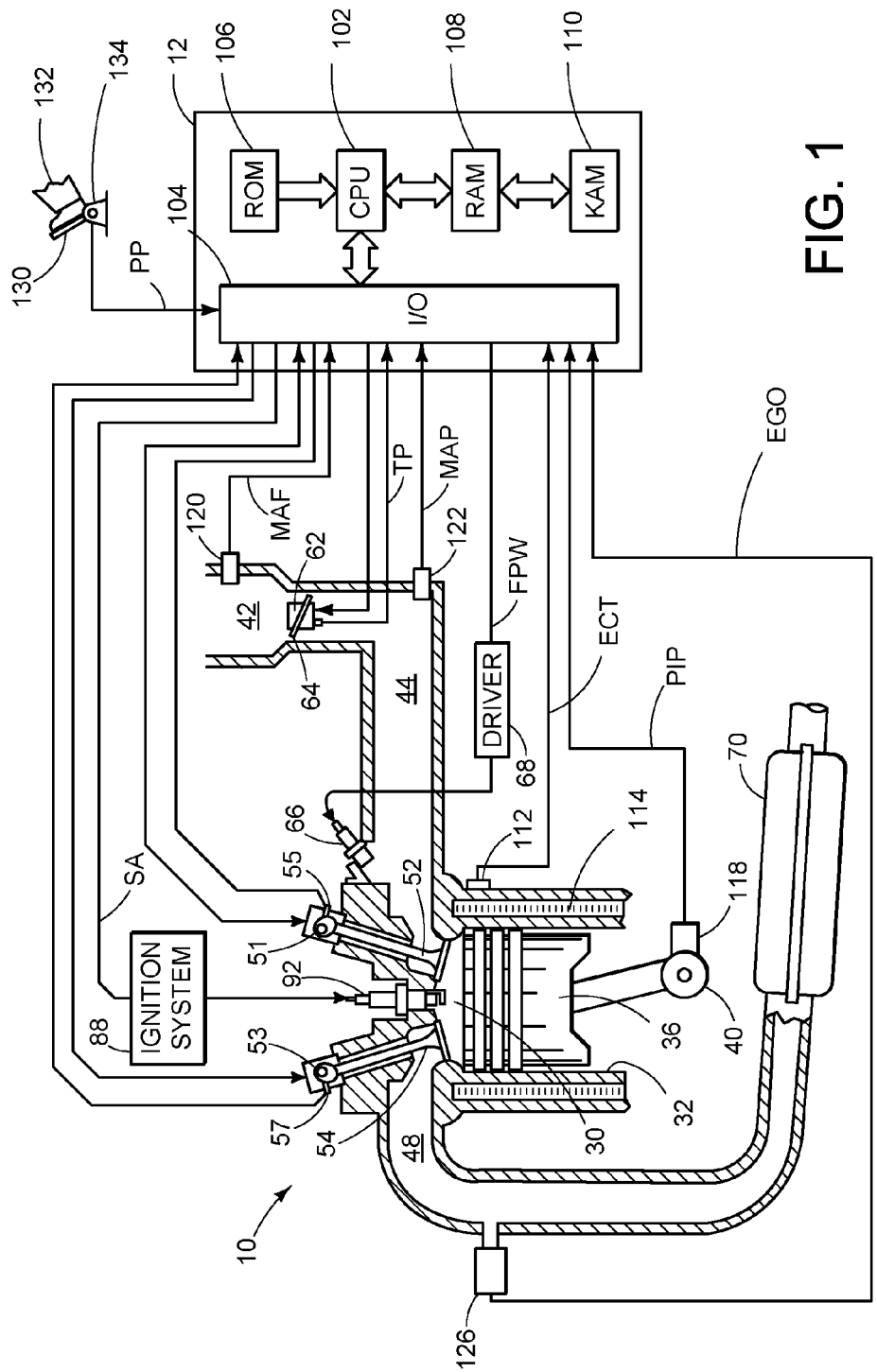
FIG. 1 is a schematic depiction of an exemplary embodiment of an engine for a vehicle.

FIG. 1 is a schematic diagram showing one cylinder of multi-cylinder engine 10, which may be included in a propulsion system of an automobile/vehicle. It should be appreciated that the following engine description and corresponding FIG. 1 provide an exemplary environment in which the combination Rankine system and hydraulic accumulator system may be applied. The system may be adapted for use with other vehicle engines without departing from the scope of the disclosure. While the examples herein describe a Rankine cycle, other exhaust gas heat recovery systems or cycles may be used, if desired.

Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of the passenger vehicle via a transmission system. Further, a starter motor may be coupled to crankshaft 40 via a flywheel to enable a starting operation of engine 10.

Combustion chamber 30 may receive intake air from intake passage 44 via intake manifold 42 and may exhaust combustion gases via exhaust passage 48. Intake passage 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown arranged in intake passage 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake manifold 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. In one example, sensor 118, which is also used as an engine speed sensor, may produce a predetermined number of equally spaced pulses every revolution of the crankshaft.

As described above, FIG. 1 shows only one cylinder of a multi-cylinder engine, and that each cylinder may similarly include its own set of intake/exhaust valves, fuel injector, spark plug, etc.

Figure 2:
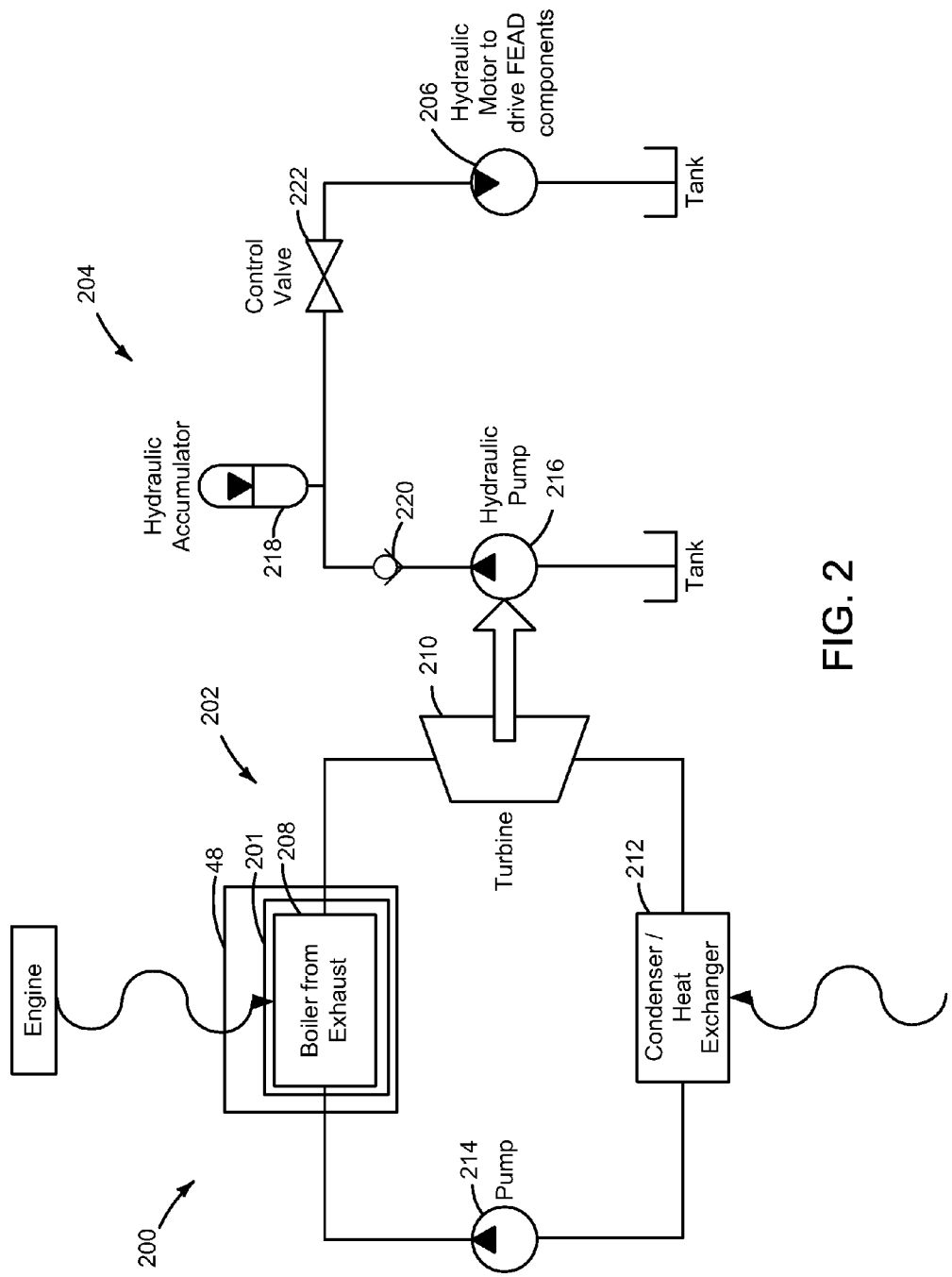
FIG. 2 is a schematic diagram of an exemplary embodiment of a combination system for use in a vehicle including a Rankine cycle system and a hydraulic accumulator system.

FIG. 2 is a schematic diagram of an exemplary embodiment of a combination system 200 including a Rankine cycle system 202 and a hydraulic accumulator system 204 that may be incorporated in a vehicle, such as a vehicle including an engine similar to the one described above in regards to FIG. 1. For example, in some embodiments, the Rankine cycle system may be integrated with the engine such that the boiler of the Rankine cycle system utilizes a portion of the exhaust system of the engine.

Referring again to FIG. 2, in the depicted embodiment, combination Rankine cycle system and hydraulic accumulator system may be operatively coupled to drive a hydraulic motor 206. In the example, the hydraulic motor is adapted to drive at least one vehicle component, such as FEAD components. Thus although described in regards to driving FEAD components, it should be appreciated that the system may be configured to drive any suitable drivable component of a vehicle.

As described above, a conventional Rankine cycle system includes: a boiler, a turbine, a condenser and a pump. As an example of a Rankine cycle system, working medium, such as water, may be circulated through a piping system to the various components such that the working medium is expanded to drive a linked mechanical device. For example, water may be supplied by the pump to an evaporator or boiler to generate water vapor. The vapor may be expanded by the turbine resulting in a power output which may be used to drive a linked mechanical device or provide electrical power to a component or system. The vapor may be recycled to the condenser where the vapor is converted back to the water phase. Although described in regards to a system using water as the working medium, other suitable fluids may be used without departing from the scope of the disclosure. The Rankine cycle system described herein may be considered a fluid machine.

In the example of FIG. 2, the boiler 208 may be an exhaust manifold or other component of the exhaust system, such as the exhaust system of the engine of FIG. 1. The boiler may be adapted to heat the working medium, e.g. water, into a saturated vapor. The superheated vapor may be expanded through turbine 210 to generate power output. Turbine 210 may be linked to a vehicle alternator to generate electricity for the vehicle. In some embodiments, the power output from the Rankine cycle system may be generated in the form of a fluid power output. This fluid power output may drive a hydraulic pump and/or hydraulic motor to drive a vehicle component, such as a FEAD component.

Following generation of the power output, the working medium (e.g. the vapor) may be directed to a condenser or heat exchanger 212. Condenser may be any suitable cooler as needed for the system. The condenser may cool the vapor to a saturated liquid of fluid. The cycle may be repeated as the pump 214 drives the working medium (working fluid) from the condenser 212 back to boiler 208. Pump 214 may be any suitable pump, including an electric pump, a mechanical pump, etc.

As an example implementation, the boiler portion may be a cavity 201 in the exhaust manifold 48. The cavity may be cast in the exhaust manifold such that the fluid may pass through the cavity. Further, in some embodiments, a series of tubes may be welded to a portion of the exhaust system. The tubing may be configured such that heat may be extracted though the exhaust wall tubing, or in some embodiments, heat may be extracted using a cross flow heat exchanger.

The turbine may be connected to hydraulic system, including a hydraulic pump, a pressure regulator, control valve and a hydraulic motor. For example, the turbine may be linked to a hydraulic pump 216 and under steady state conditions may provide hydraulic power to run one or more vehicle components. For example, the turbine may be operatively coupled to a hydraulic pump which may be configured to drive the FEAD. It is noted that tanks or other suitable storage devices may be provided in the hydraulic system. In some embodiments, a pressure regulator may regulate the pressure in the hydraulic system. The pressure regulator may be linked to a controller to ensure a suitable pressure in the system depending on engine conditions and use.

As described in more detail below, the Rankine cycle system 202 may be operatively linked with a hydraulic accumulator system 204. During operation of the engine at a steady state operating condition, the Rankine cycle system provides the power output to drive the hydraulic motor to drive the vehicle component. However, upon detection of an engine condition where the working fluid of the Rankine cycle system in not at operation temperature or when the engine is shut off, the hydraulic accumulator system, including a hydraulic accumulator 218, a check valve 220 and a control valve 222, may be triggered. In the condition where the working fluid of the Rankine cycle system is not at operating temperature, triggering of the hydraulic accumulator system may include release of stored fluid power such that the hydraulic accumulator 218 generates the power to drive the hydraulic motor to drive the vehicle component. In the event that the engine is cut off, the control valve or similar device may redirect fluid power produced from the Rankine cycle system for storage in the hydraulic accumulator. In this way, the combination system may be primed for the next engine start condition.

Figure 3:
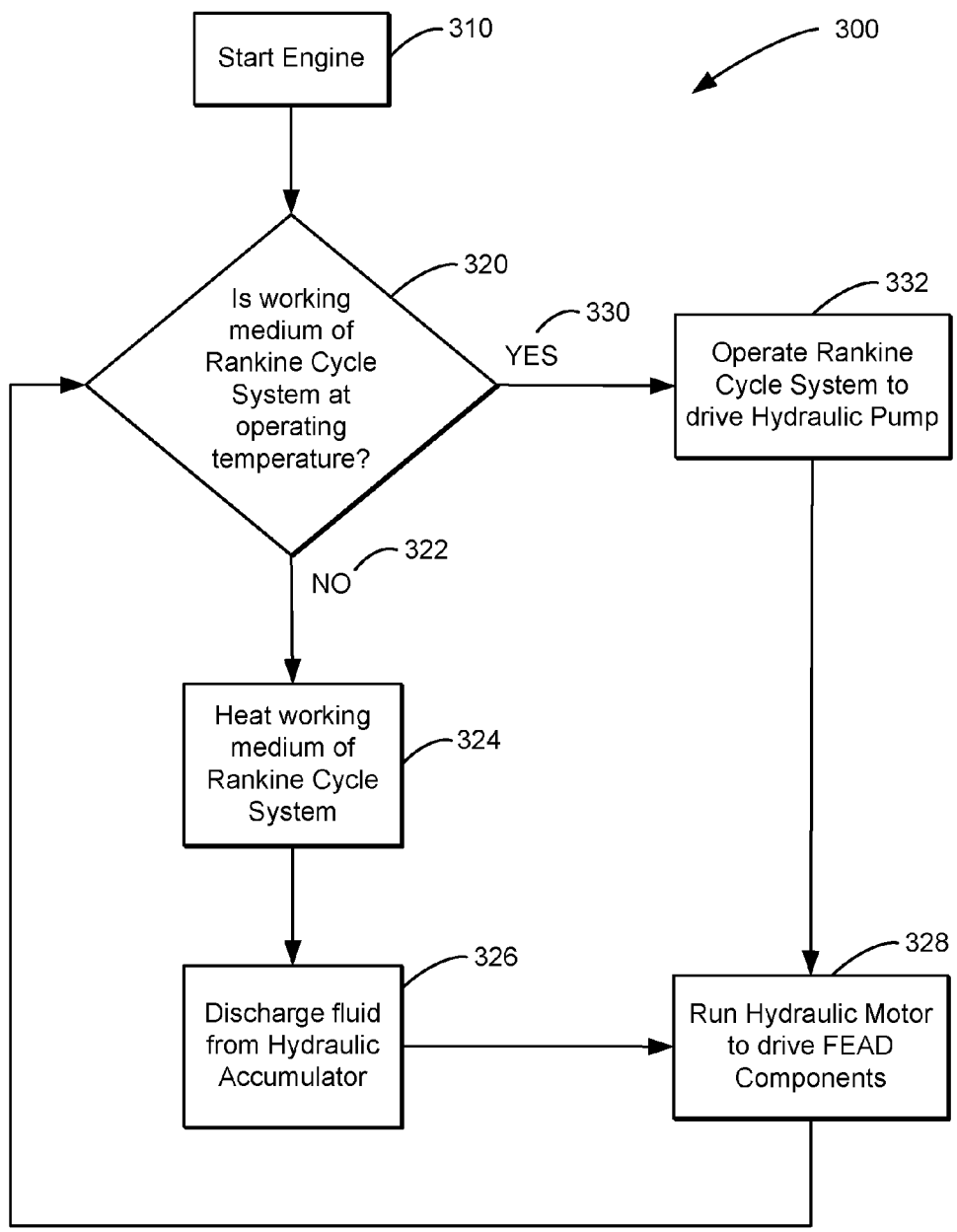
FIG. 3 is a flow diagram of an exemplary embodiment of a method to drive FEAD components from a start-up condition using a combination system including a Rankine cycle system and a hydraulic accumulator system.

FIG. 3 provides a flow diagram of one embodiment of a method to drive FEAD components based on different engine operating conditions. Although described in regards to driving FEAD components, it should be appreciated that the method may be used to drive other components. As depicted, the engine may be started as indicated at 310. The routine continues at 320, where it is determined whether the working medium of the Rankine cycle system is at operating temperature.

Thus, as described above, for operation of the Rankine cycle system, the boiler must sufficiently heat the working medium from a first phase to a second phase, such as from a liquid to a vapor. Depending on the condition of the vehicle, there may be a delay before the working medium is at sufficient temperature to convert from the first to second phase. For example, a cold start condition may result in a delay of operation of the Rankine cycle system.

In some embodiments, temperature sensors or temperature estimates may be used to identify the state of the engine. Such temperature sensors and/or estimates may be used to determine the status or temperature of the working medium of the Rankine cycle system. Controller 12 in FIG. 1 may receive signals from the sensors to determine operation of the combination system. For example, temperature sensors may identify that the engine is in a first engine state or a second engine state. Identification of the first engine state may occur where the working medium is substantially at an operating temperature for effective utilization of the Rankine cycle system. Identification of a second engine state may occur where the working medium is not at an operating temperature for effective utilization of the Rankine cycle system. Thus, when the temperature sensor or sensors detect a cold engine condition (such as a cold start condition), the controller may signal and direct operation of the hydraulic accumulator system.

Continuing with FIG. 3, if the working medium is not at operating temperature (as indicated at 322), then the routine continues, in 324, with heating of the working medium of the Rankine cycle system. During, before, or after heating the working medium, the routine continues, with operation of the hydraulic system through operation of the hydraulic accumulator. As described above, the hydraulic accumulator may include prestored fluid power which may be released to drive the hydraulic motor. The hydraulic motor may be used to drive the FEAD components. Thus, during the transition when the working medium is not at sufficient operating temperature, fluid may be released form the hydraulic accumulator, in 326. This fluid power may be used to drive the hydraulic motor, 328. In this way, the hydraulic system for driving the FEAD components may be operational while the Rankine cycle and/or engine system is warming up.

Once the working medium is at sufficient operating temperature at 332, then the routine continues where the Rankine cycle system provides the energy to drive the hydraulic system.

Figure 4:
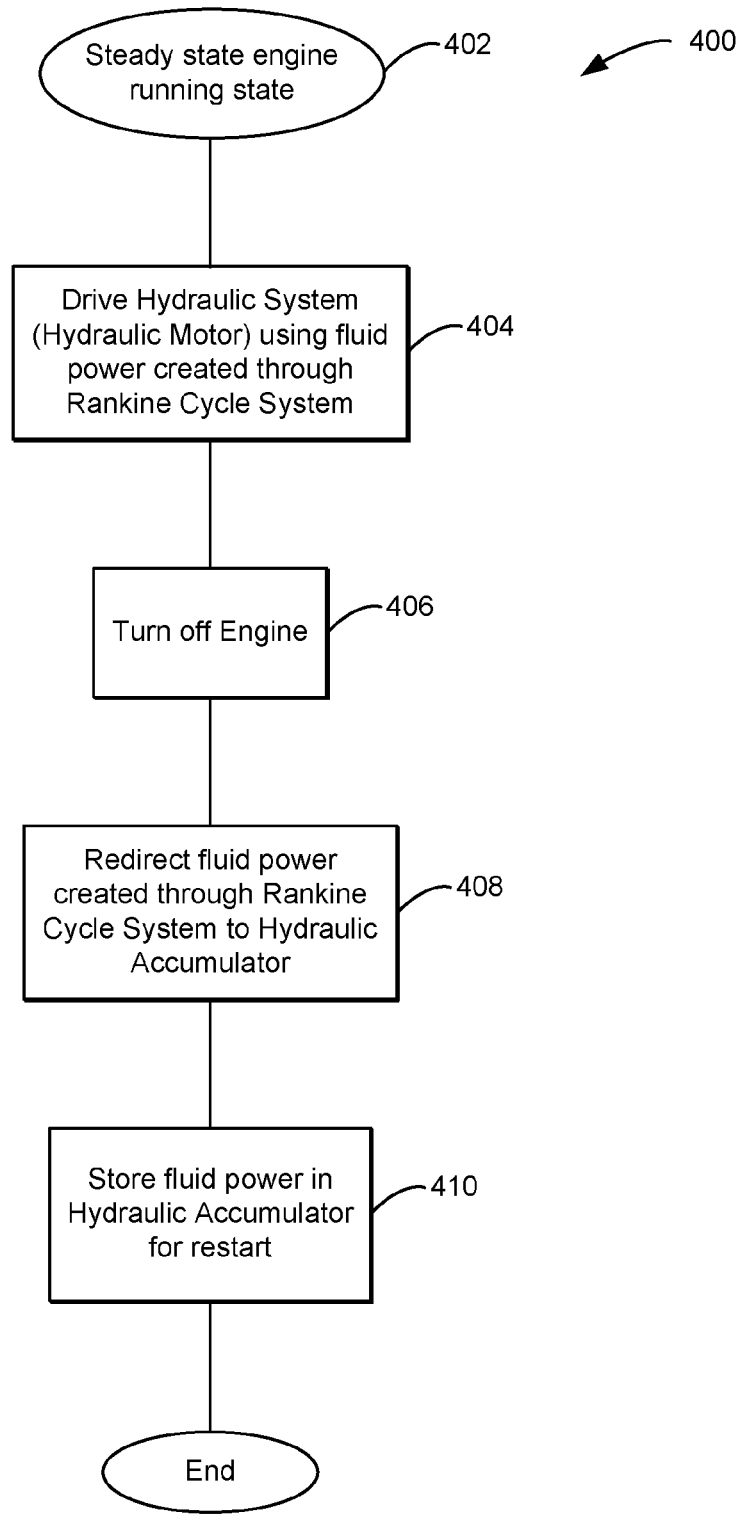
FIG. 4 is another flow diagram of an exemplary embodiment of a method of using a combination system including a Rankine cycle system and a hydraulic accumulator system.

FIG. 4 is a flow diagram of the combination Rankine cycle system and hydraulic accumulator system for driving FEAD components. The routine begins, in 402, with the engine in a steady state such that the engine is operating at or above a threshold operation temperature.

During these steady state conditions, the hydraulic system may be driven through fluid power created by the Rankine cycle system, as indicated at 404. As described above, the working medium may be expanded such that the turbine drives the hydraulic pump of the hydraulic system. The hydraulic pump may drive the hydraulic motor to drive the FEAD components. Operation continues in this steady state with the FEAD components driven by the Rankine cycle system.

The method continues at 406 with shut off of the engine. Engine shut off may occur when a user arrives at a destination and shuts off the vehicle. Engine shut off may be considered a third engine state. At this time, the Rankine cycle system is at operating temperature however the fluid power output to drive the FEAD components is no longer necessary. A controller, upon detection of this third engine state, may signal redirection of the fluid power. For example, identification of the third engine state may result in operation of a control valve or similar mechanical/electro-mechanical valve. Thus, in these conditions, the fluid power created from the Rankine cycle system may be redirected to a hydraulic accumulator at 408. This fluid power may be stored in the accumulator, at 410, for use under the next cold start condition as described previously in regards to FIG. 3.

Figure 5:
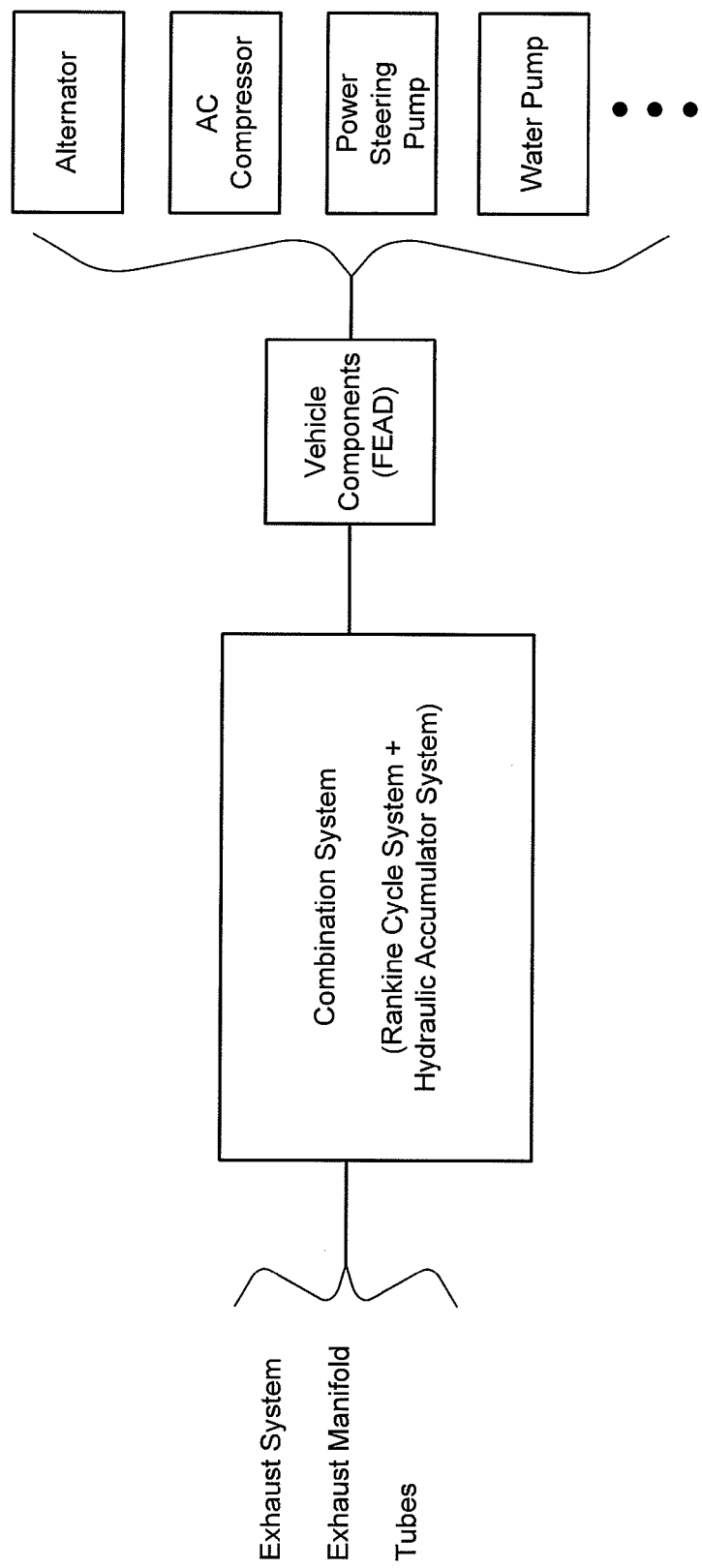
FIG. 5 is a schematic depiction of an exemplary embodiment of a combination system for use in a vehicle including a Rankine cycle system and a hydraulic accumulator system.

FIG. 5 is a schematic depiction of an exemplary embodiment of a combination system for use in a vehicle including a Rankine cycle system and a hydraulic accumulator system. Specifically, as illustrated, a combination system including a Rankine cycle system and a hydraulic accumulator system are provided. The Rankine cycle system may be integrated with a vehicle engine such that the boiler of the Rankine cycle system utilizes a portion of the exhaust system of the engine, such as a portion of the exhaust manifold or a series of tubes. The combination Rankine cycle system and hydraulic accumulator system may be operatively coupled to drive a hydraulic motor adapted to drive at least one vehicle component, such as a FEAD component, such as the alternator, the AC compressor, water pump, power steering pump, etc.

The following claims particularly point out certain combinations and subcombinations regarded as novel and nonobvious. These claims may refer to "an" element or "a first" element or the equivalent thereof. Such claims should be understood to include incorporation of one or more such elements, neither requiring, nor excluding tow or more such elements. Other combinations and subcombinations of the Rankine cycle system and the hydraulic accumulator system, methods, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for driving front end accessory drive components, the method comprising:
generating fluid power from a Rankine cycle system coupled to an exhaust system of a vehicle to drive the front end accessory drive components and increase pressure in a hydraulic accumulator system during a steady-state engine operation state; and
generating fluid power from the hydraulic accumulator system to drive the front end accessory drive components during a cold start condition.

2. The method of claim 1, wherein the Rankine cycle system includes a boiler, a pump, a turbine and a condenser.

3. The method of claim 2, wherein the boiler is a portion of an exhaust system of a vehicle.

4. The method of claim 3, wherein the boiler is a cavity in an exhaust manifold.

5. The method of claim 1, wherein a working medium of the Rankine cycle system is substantially at an operating temperature during the steady-state engine operation state.

6. The method of claim 1, wherein a working medium of the Rankine cycle system is not at operating temperature during the cold start condition.

7. The method of claim 1, further comprising restoring fluid power to the hydraulic accumulator system during a third engine state, wherein the third engine state is engine shut off.

8. The method of claim 7, wherein the Rankine cycle system generates fluid power for storage in the hydraulic accumulator system.

9. The method of claim 8, further comprising triggering at least one of a check valve and a control valve to direct fluid power from the Rankine cycle system to the hydraulic accumulator system during the third engine state.

10. The method of claim 1 wherein the hydraulic accumulator system includes a hydraulic pump rotatably coupled to the turbine of the Rankine system, a hydraulic accumulator, and a hydraulic motor operably coupled to one or more Front End Accessory Drive components.

11. A method to run front end accessory drive components of an engine coupled in a vehicle, the method comprising:
generating a power output through a Rankine cycle system during a steady-state engine operation state;
utilizing the power output to drive a hydraulic motor operatively coupled to the front end accessory drive components during the steady-state engine operation state;
storing the power output from the Rankine cycle system in a hydraulic accumulator system; and
releasing the power output stored in the hydraulic accumulator system to drive the hydraulic motor operatively coupled to the front end accessory drive components during a cold start condition of the vehicle's engine.

12. The method of claim 11, where a working medium of the Rankine cycle system is at an operating temperature during the steady-state engine operation state.

* * * * *